United States Patent
Jin et al.

(10) Patent No.: US 10,812,579 B2
(45) Date of Patent: Oct. 20, 2020

(54) METHOD AND SYSTEM FOR CLOUD STORAGE OF VIDEO, AND METHOD AND SYSTEM FOR PREVIEWING CLOUD—STORED VIDEO

(71) Applicant: Hangzhou Hikvision Digital Technology Co., Ltd., Zhejiang (CN)

(72) Inventors: Ping Jin, Zhejiang (CN); Weichun Wang, Zhejiang (CN)

(73) Assignee: HANGZHOU HIKVISION DIGITAL TECHNOLOGY CO., LTD., Zhejiang (CN)

( * ) Notice: Subject to any disclaimer, the term of this patent is extended or adjusted under 35 U.S.C. 154(b) by 294 days.

(21) Appl. No.: 15/568,367

(22) PCT Filed: Jan. 22, 2016

(86) PCT No.: PCT/CN2016/071772
§ 371 (c)(1),
(2) Date: Oct. 20, 2017

(87) PCT Pub. No.: WO2016/169308
PCT Pub. Date: Oct. 27, 2016

(65) Prior Publication Data
US 2018/0103090 A1 Apr. 12, 2018

(30) Foreign Application Priority Data
Apr. 21, 2015 (CN) .......................... 2015 1 0190857

(51) Int. Cl.
*H04L 29/08* (2006.01)
*H04N 21/218* (2011.01)
(Continued)

(52) U.S. Cl.
CPC .... *H04L 67/1031* (2013.01); *G08B 13/19665* (2013.01); *H04L 29/08144* (2013.01);
(Continued)

(58) Field of Classification Search
CPC .................. H04L 29/06482–651; H04L 29/08702–08729;
(Continued)

(56) References Cited

U.S. PATENT DOCUMENTS 5,829,046 A * 10/1998 Tzelnic ............... G06F 12/0866
711/162
2004/0028391 A1 2/2004 Black et al.
(Continued)

FOREIGN PATENT DOCUMENTS

CN 101986703 A 3/2011
CN 102196248 A 9/2011
(Continued)

OTHER PUBLICATIONS

International Search Report for International Patent Application No. PCT/CN2016/071772 dated Apr. 14, 2016 (English language translation attached).

(Continued)

*Primary Examiner* — Brendan Y Higa
(74) *Attorney, Agent, or Firm* — Moore & Van Allen PLLC; Henry B. Ward, III (57) ABSTRACT

Disclosed are a method and system for cloud storage of a video, and method and system for previewing a cloud-stored video. The method for the cloud storage of the video includes: after receiving a video recording plan issued by a platform, a management server determines a target storage device according to a load balancing policy, and issues the video recording plan to the target storage device; the target storage device obtains and stores, according to the video recording plan, a video stream from a front-end device corresponding to the video recording plan; when the target storage device is not able to obtain the video stream from the front-end device, the target storage device sends an alarm to
(Continued)

the management server; and after receiving the alarm, the management server issues the video recording plan to other storage devices according to the load balancing policy.

10 Claims, 4 Drawing Sheets

(51) Int. Cl.
    *H04N 21/231*     (2011.01)
    *H04N 7/18*     (2006.01)
    *H04N 21/647*     (2011.01)
    *H04N 21/2743*     (2011.01)
    *G08B 13/196*     (2006.01)
    *H04L 29/06*     (2006.01)

(52) U.S. Cl.
    CPC .. *H04L 29/08153* (2013.01); *H04L 29/08171* (2013.01); *H04L 29/08189* (2013.01); *H04L 29/08243* (2013.01); *H04L 29/08702* (2013.01); *H04L 67/1004* (2013.01); *H04L 67/1008* (2013.01); *H04L 67/1012* (2013.01); *H04L 67/1025* (2013.01); *H04L 67/1034* (2013.01); *H04L 67/1097* (2013.01); *H04N 7/18* (2013.01); *H04N 7/181* (2013.01); *H04N 21/2181* (2013.01); *H04N 21/23103* (2013.01); *H04N 21/2743* (2013.01); *H04N 21/6473* (2013.01); *H04L 67/42* (2013.01)

(58) Field of Classification Search
    CPC ....... H04L 29/08144–08288; H04L 29/08801; H04L 65/60; H04L 65/67; H04L 65/06; H04L 67/10–1034; H04L 67/1097; H04L 67/2842; H04L 2012/2849; H04L 67/06; H04N 7/18–188; H04N 21/231–2335; H04N 21/27–2743; G08B 13/19654–19656; G08B 13/19665; G08B 23/00

See application file for complete search history.

(56) References Cited

U.S. PATENT DOCUMENTS

| | | |
|---|---|---|
| 2006/0204229 A1 | 9/2006 | Onodera |
| 2006/0279628 A1* | 12/2006 | Fleming ............... G11B 27/034 |
| | | 348/143 |
| 2008/0281977 A1 | 11/2008 | Branam et al. |
| 2009/0295925 A1* | 12/2009 | Miyamaki .......... H04N 1/00286 |
| | | 348/159 |
| 2011/0110643 A1* | 5/2011 | Chandra .................. H04N 5/76 |
| | | 386/223 |
| 2012/0060052 A1 | 3/2012 | White et al. |
| 2012/0092510 A1* | 4/2012 | Masters ................. H04N 5/247 |
| | | 348/207.1 |
| 2012/0124631 A1* | 5/2012 | Xia ..................... H04N 21/2393 |
| | | 725/109 |
| 2012/0260298 A1* | 10/2012 | Chen ................. H04N 7/17318 |
| | | 725/114 |
| 2013/0235209 A1* | 9/2013 | Lee ....................... H04N 5/765 |
| | | 348/159 |
| 2015/0022666 A1 | 1/2015 | Kay et al. |
| 2015/0215583 A1* | 7/2015 | Chang .................... H04N 7/181 |
| | | 348/159 |

FOREIGN PATENT DOCUMENTS

| | | |
|---|---|---|
| CN | 102355572 A | 2/2012 |
| CN | 103248868 A | 8/2013 |
| CN | 103856760 A | 6/2014 |
| CN | 104023246 A | 9/2014 |
| CN | 104113735 A | 10/2014 |

OTHER PUBLICATIONS

Written Opinion for International Patent Application No. PCT/CN2016/071772 dated Apr. 14, 2016.
Extended European Search Report issued by the European Patent Office in European Patent Application No. 16782456.4, dated Aug. 2, 2018.
Search Report issued by the Chinese National Intellectual Property Administration in Chinese Patent Application No. 2015101908579.

* cited by examiner

METHOD AND SYSTEM FOR CLOUD STORAGE OF VIDEO, AND METHOD AND SYSTEM FOR PREVIEWING CLOUD—STORED VIDEO

This application claims the priority to the Chinese patent application No. 201510190857.9, filed with the Chinese Patent Office on Apr. 21, 2015 and entitled "method and system for cloud-based storage of video, and method and system for previewing cloud-stored video", the entire contents of which are hereby incorporated by reference in the present application.

TECHNICAL FIELD

The disclosure relates to a video cloud storage technology, and more particularly, to a method and system for cloud storage of a video, and method and system for previewing a cloud-stored video.

BACKGROUND

The video cloud storage system is a system extended and developed out from a cloud computing concept and having functions such as cluster application, network technology or distributed file system. The video cloud storage system gatheres application software to collaboratively work and jointly provides functions (such as video data storage and service access) for the outside.

With regard to a cloud storage system at present, the cloud storage system obtains a stream from a front-end device (such as IP camera (IPC)), stores the obtained stream in a storage device, and a platform also obtains the stream from the front-end device to preview. Both a cloud storage device and the platform obtain the stream from the front-end device via a network. In an actual application scene, it is frequent that a front-end IPC merely is able to output one path of video stream due to a network bandwidth problem. When the network is abnormal or the front-end device merely supports to output one path of the stream, the storage function and the preview function cannot be performed simultaneously at this moment, and therefore the requirements of the cloud storage system cannot be met.

Figure 1:
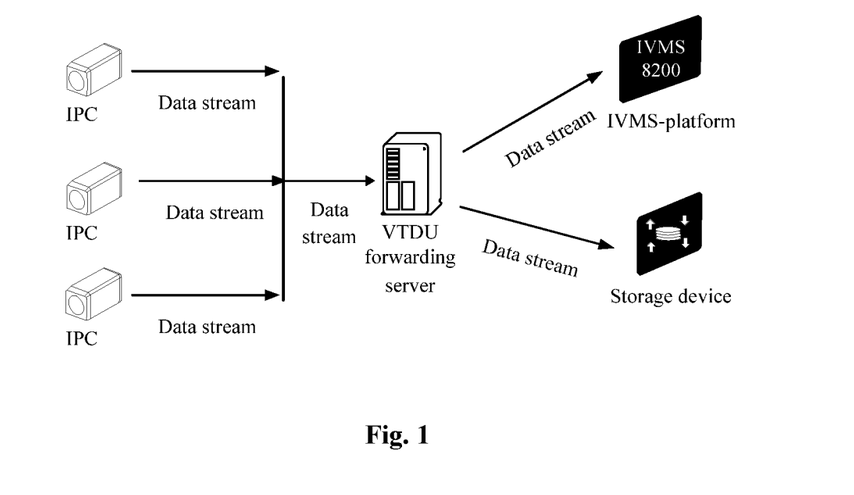
FIG. 1 is an operation diagram of a system, for cloud storage, of the related art in a normal use environment.

The stream of the front-end IPC may be accessed to an external Video Transfer & Distribute Unit (VTDU), and the stream which is previewed by the platform and the stream which is storage by the storage device, are both obtained from the VTDU to be stored. Under a normal use environment, as shown in FIG. 1, the front-end device (the IPC as shown in FIG. 1) writes a data stream to an external VTDU forwarding server, the platform (an IVMS-platform as shown in FIG. 1) obtains the data stream via the VTDU forwarding server to preview, and the cloud storage device (the storage device as shown in FIG. 1) obtains the data stream via the VTDU forwarding server to store. In this way, a conflict brought by the front-end device that merely is able to output one path of the data stream due to the network bandwidth problem may be solved. However, defects of such scheme are also obvious. For a large-scale storage system, with relatively more front-end devices, a great number of the VTDU forwarding servers are needed to forward the VTDU, such that the cost of the whole system is greatly increased. Moreover, there exists the inherent defect that the fault is easily generated due to a single point and the work cannot be continued, for example, when some VTDU forwarding server is in fault, other front-end devices connected with the VTDU forwarding server cannot perform the transmission and storage of the data stream.

Figure 2:
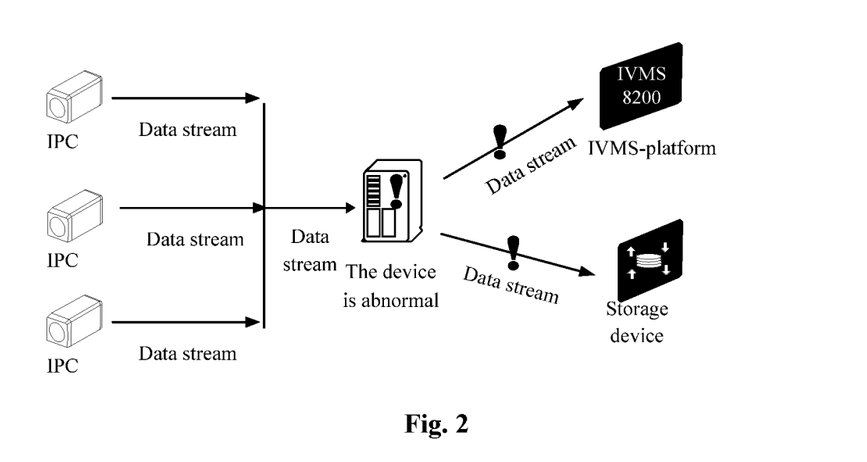
FIG. 2 is an operation diagram of a system, for cloud storage, of the related art in an abnormal use environment.

If the number of the VTDU forwarding servers is reduced from the perspective of cost control, the framework that a great number of the front-end devices are accessed to a small number of the forwarding servers will occur. As a result, the pressure of the forwarding servers is increased and therefore the stream obtaining speed is limited. Furthermore, the external VTDU forwarding servers are difficult to perform load balancing under the condition that a load is overhigh, and in case of a continuous operation, are easily crashed. In addition, due to inevitable reasons such as server failure, as shown in FIG. 2, the video stream (the video stream as shown in FIG. 2) of the front-end device (such as the PIC as shown in FIG. 2) accessed to the server cannot be extracted, resulting in the faults such as the platform (the IVMS-platform as shown in FIG. 2) fails to preview the video or the cloud-stored data (the data stream as shown in FIG. 2) are lost; and consequently, the reliability of the whole video cloud storage system (the storage device as shown in FIG. 2) is relatively poor.

SUMMARY

The technical problem to be solved by the disclosure is how to overcome the defect that the reliability of the video cloud storage system is relatively poor in the related art.

To solve the technical problem, the embodiments of the disclosure first provide a method for cloud storage of a video, including: after a management server receives a video recording plan issued by a platform, determining a target storage device according to a load balancing policy, and issuing the video recording plan to the target storage device; obtaining and storing, by the target storage device, according to the video recording plan, a video stream from a front-end device corresponding to the video recording plan; when the target storage device is not able to obtain the video stream from the front-end device, sending an alarm to the management server; and after the management server receives the alarm, issuing the video recording plan to other storage devices according to the load balancing policy.

According to an example embodiment, obtaining and storing, by the target storage device, according to the video recording plan, the video stream from the front-end device corresponding to the video recording plan includes: generating, by the target storage device, according to the video recording plan, a video access parameter, and obtaining the video stream from the front-end device according to the video access parameter.

According to an example embodiment, the method includes: after the target storage device receives the video recording plan, generating index information for the video recording plan, and sending the index information to the management server, wherein the index information at least includes an identifier and an address of the target storage device.

According to an example embodiment, the method includes: after the management server receives the alarm, issuing all video recording plans being executed by the target storage device to other storage devices according to locally recorded index information and the load balancing policy.

According to an example embodiment of the present disclosure, a system for cloud storage of a video is provided, including a management server and a target storage device, wherein: the management server is configured, after receiving a video recording plan issued by a platform, to determine the target storage device according to a load balancing policy and issue the video recording plan to the target storage device, and after receiving an alarm sent by the target storage device, to issue the video recording plan to other storage devices according to the load balancing policy; the target storage device is configured, according to the video recording plan, to obtain and store a video stream from a front-end device corresponding to the video recording plan; and when the target storage device is not able to obtain the video stream from the front-end device, to send the alarm to the management server.

According to an example embodiment, the target storage device includes: a video access service component, configured to generate a video access parameter according to the video recording plan; a Video Transfer & Distribute Unit (VTDU) forwarding component, configured to obtain the video stream from the front-end device according to the video access parameter.

According to an example embodiment, the target storage device includes: an index component, configured to generate index information for the video recording plan, and send the index information to the management server, wherein the index information at least includes an identifier and an address of the target storage device.

According to an example embodiment, the management server is configured, after receiving the alarm, to issue all video recording plans being executed by the target storage device to other storage devices according to locally recorded index information and the load balancing policy.

According to an example embodiment of the present disclosure, a method for previewing a cloud-stored video is provided, including: after a Video Transfer & Distribute Unit Client (VTDU-client) receives a preview request sent by a platform, sending a preview instruction to a management server, wherein the preview instruction includes Identifier (ID) information of a front-end device; receiving, by the management server, the preview instruction and according to the ID information of the front-end device, redirecting to a storage device which currently stores a video stream provided by the front-end device and determining ID information of the storage device; sending, by the management server, redirection information to the VTDU-client, wherein the redirection information includes the ID information of the storage device; sending, by the VTDU-client, a stream obtaining instruction to the storage device according to the ID information of the storage device; and obtaining, by the storage device, the video stream from the front-end device and forwarding to the VTDU-client to preview.

According to an example embodiment, the method includes: when the storage device is abnormal such that the storage device is not able to obtain the video stream from the front-end device, automatically reconnecting, by the VTDU-client, to the management server; and redirecting, by the management server, according to an automatic reconnection, the preview instruction to other storage devices which continue to store the video stream provided by the front-end device, and continuing to obtain the video stream from said other storage devices.

According to an example embodiment of the present disclosure, a system for previewing a cloud-stored video is provided, including a Video Transfer & Distribute Unit Client (VTDU-client), a management server and a storage device, wherein: the VTDU-client is configured, after receiving a preview request sent by a platform, to send a preview instruction to the management server, wherein the preview instruction includes Identifier (ID) information of a front-end device; to send a stream obtaining instruction to the storage device according to ID information of the storage device; and to receive a video stream sent by the storage device and to preview; the management server is configured to receive the preview instruction and according to the ID information of the front-end device, redirect to the storage device which currently stores the video stream provided by the front-end device and determine the ID information of the storage device; and to send redirection information to the VTDU-client, wherein the redirection information includes the ID information of the storage device; the storage device is configured to obtain the video stream from the front-end device and forward the obtained video stream to the VTDU-client according to the stream obtaining instruction.

According to an example embodiment, the VTDU-client is configured, when a preview is abnormal, to automatically reconnect the management server; the management server is configured, according to an automatic reconnection, to redirect the preview instruction to other storage devices which continue to store the video stream provided by the front-end device and continue to obtain the video stream from said other storage devices.

Compared with the related art, the embodiments of the disclosure effectively guarantee that the platform preview and the data storage may be performed simultaneously under the condition that the front-end device merely can output a single path of the stream. In the embodiments of the disclosure, by performing load balancing among the VTDU forwarding servers, the burdensome operating pressure of the VTDU forwarding servers can be effectively relieved, and while the stream obtaining speeds of the device for the cloud storage and the platform are guaranteed, the fault rate of the VTDU forwarding servers can be effectively reduced, the adaptability and the operation efficiency of the system for the cloud storage of the video are effectively improved, and the service life of the VTDU forwarding servers is effectively prolonged. According to the embodiments of the disclosure, by means of a load balancing technology, the security and the effectiveness of the video preview and storage are effectively guaranteed, and while the user requirement is met, the system cost is saved.

Other characteristics and advantages of the disclosure will be described hereinafter, and will become partially obvious from the specification or be understood by way of implementing the technical solutions of the disclosure. The objectives and other advantages of the disclosure may be achieved and obtained using a structure and/or a process specifically indicated by the specification, claims and accompanying drawings.

BRIEF DESCRIPTION OF THE DRAWINGS

The accompanying drawings provide a further understanding for the technical solutions or the related art of the disclosure, and constitute a part of the specification. The accompanying drawings are used to explain the technical solutions of the disclosure along with embodiments of the disclosure, and are not intended to impose any limitations on the technical solutions of the disclosure.

DETAILED DESCRIPTION OF THE EMBODIMENTS

The implementation ways of the disclosure will be described below in detail with reference to the accompanying drawings and the embodiments so as to fully understand how the disclosure solves the technical problem by employing a technical means and an implementation process which achieves corresponding technical effect, and to implement hereto. The embodiments of the disclosure and the features thereof can be combined with each other if no conflict is caused, and the formed technical solutions all fall within the scope of protection of the disclosure.

In addition, the steps included in the method shown by the accompanying drawings in the embodiments of the disclosure may be executed such as in a computer system with a group of computer executable instructions. Moreover, a certain logical sequence when the technical solutions of the disclosure are executed is embodied by the method of the embodiments of the disclosure in the shown flowchart, but generally, the logical sequence is merely limited to the embodiments shown by the flowchart. In some other embodiments of the disclosure, the logical sequence of the technical solutions of the disclosure also may be implemented in a manner different from that shown in the accompanying drawings.

Figure 3:
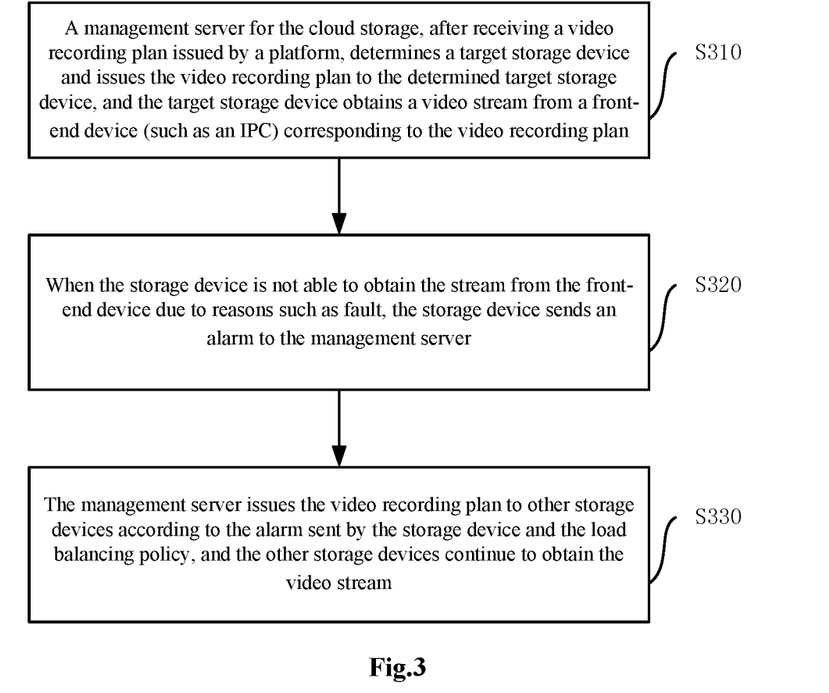
FIG. 3 is a flowchart of a method for cloud storage of a video in an embodiment of the disclosure.

A method for cloud storage of a video in the embodiments of the disclosure is mainly applied in a scenario that a storage device in a cloud storage system obtains and stores a stream from a front-end device. As shown in FIG. 3, the method mainly includes the following steps.

In step S310, a management server of the cloud storage system, after receiving a video recording plan issued by a platform, determines a target storage device and issues the video recording plan to the determined target storage device, and the target storage device obtains a video stream from a front-end device (such as an IPC) corresponding to the video recording plan.

In the embodiments of the disclosure, a VTDU forwarding component is provided in the storage device. The built-in VTDU forwarding component in the storage device is mainly intended to obtain a stream from the front-end device accessed to the system, forward the video stream to a storage module of the storage device to store, and provide the video stream for the platform so as to preview on the platform.

The platform issues the video recording plan to the management server, wherein the video recording plan needs to be formulated for the front-end IPC to store the video stream (or a data stream). The management server issues the video recording plan issued by the platform to a video access service component in the designated target storage device according an operating condition of the system for the cloud storage at present and a preset load balancing policy. The storage device, after receiving the video recording plan, generates index information for the video recording plan and records locally the generated index information, and sends the index information to the management server, such that the management server is able to be smoothly and accurately informed of, according to the index information, that the storage device is executing the video recording plan.

Generally, one management server corresponds to a plurality of storage devices. Each of the storage devices, more or less, executes different numbers of the video recording plans. Each of the video recording plans corresponds to one piece of index information, which at least records ID information and a link address of the storage device. The management server may be accurately informed of, according to the index information stored locally, which video recording plans are being executed at present by each of the storage devices.

The video access service component in the storage device performs a local configuration according to the video recording plan to generate a corresponding video access parameter. The VTDU forwarding component provided in the storage device obtains the stream from the front-end device according to the video access parameter, and receives the video stream sent by the front-end device. The video stream received by the VTDU forwarding component is locally stored by the storage component in the storage device.

In step S320, when the storage device is not able to obtain the stream from the front-end device due to reasons such as fault, the storage device sends an alarm to the management server; and the management server receives the alarm sent when the storage device is not able to obtain the stream from the front-end device.

When the built-in VTDU forwarding component of the storage device is abnormal so that it cannot obtain the stream from the front-end device, an alarm module in the storage device gives the alarm to the management server.

In step S330, the management server issues the video recording plan to other storage devices according to the alarm sent by the storage device and the load balancing policy, and the other storage devices continue to obtain the video stream.

After receiving the alarm, the management server further may obtain all video recording plans being executed by the abnormal storage device according to the locally recorded index information, issues the all video recording plans being executed by the abnormal storage device to the other storage devices according to the load balancing policy and updates the index information corresponding to these video recording plans; and then, the provided-in VTDU forwarding components in the other storage devices continue to obtain and store the stream. In this way, it is ensured that the video data provided by the front-end device are not lost.

Figure 4:
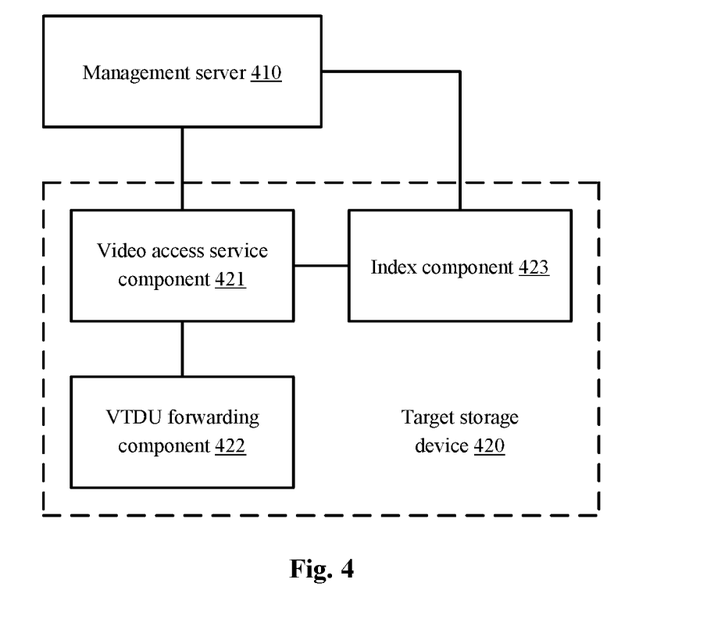
FIG. 4 is a structural diagram of a system for cloud storage of a video in an embodiment of the disclosure.

The embodiments of the disclosure provide a system for cloud storage of a video. As shown in FIG. 4, the system includes a management server 410, and a target storage device 420 designated by the management server.

The management server 410 is configured, after receiving a video recording plan issued by a platform, to determine the target storage device 420 according to a load balancing policy and issue the video recording plan to the target storage device 420, and after receiving an alarm of the target storage device 420, to issue the video recording plan to other storage devices according to the load balancing policy.

The target storage device 420 is configured, according to the video recording plan issued by the management server 410, to obtain and store a video stream from a front-end device corresponding to the video recording plan; and when it is not able to obtain the video stream from the front-end device, to send an alarm to the management server 410 and report an abnormal condition to the management server 410.

As shown in FIG. 4, in the embodiments of the disclosure, the target storage device 420 includes: a video access service component 421 and a VTDU forwarding component 422. The video access service component 421 is connected with the management server 410, receives the video recording plan issued by the management server 410 and generates a video access parameter according to the received video recording plan. The VTDU forwarding component 422 is connected with the video access service component 421 and the front-end device, and is configured to obtain the video stream from the front-end device according to the video access parameter.

As shown in FIG. 4, in the embodiments of the disclosure, the target storage device 420 further may include: an index component 423, connected with the management server 410, further connected with the video access service component 421 or other component s used for receiving the video recording plan, and configured to generate index information for the video recording plan, send the index information to the management server 410, or send the index information to the management server by means of other components which are able to communicate with the management server. The index information at least includes an identifier and an address of the target storage device 420. The management server 410 is configured, after receiving the alarm, to be able to issue all video recording plans being executed by the target storage device 420 to other storage devices according to the locally recorded index information and the load balancing policy.

Figure 5:
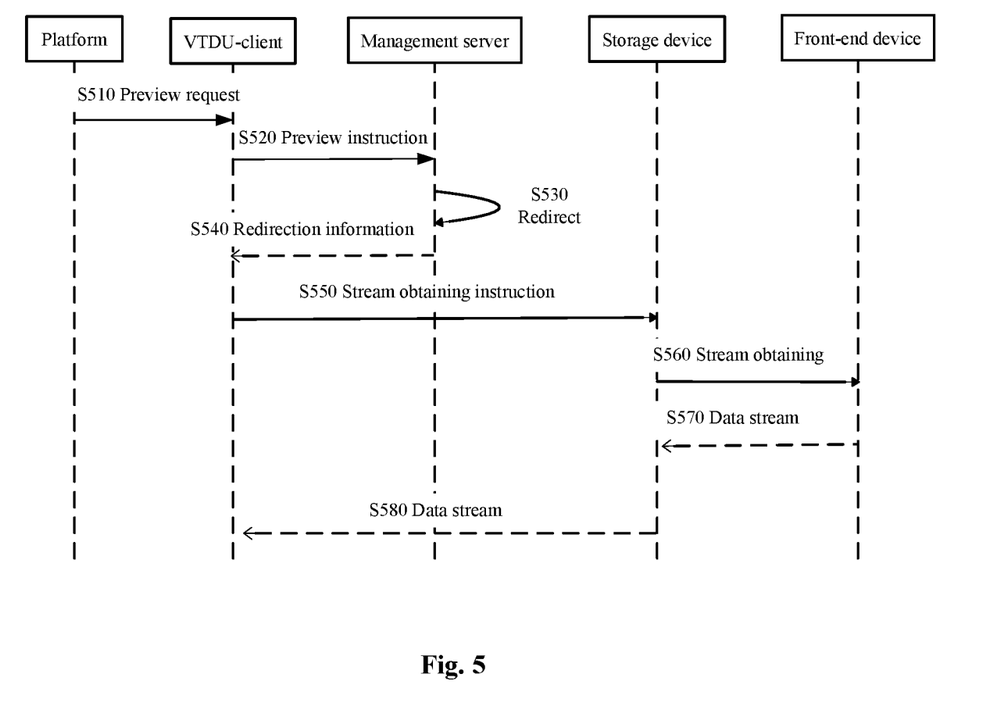
FIG. 5 is a flowchart of a method for previewing a cloud-stored video in an embodiment of the disclosure.

When there is a need for the platform to preview a cloud-stored video, as shown in FIG. 5, a method for previewing the cloud-stored video in the disclosure mainly includes the following steps.

In step S510, the platform sends a preview request to a VTDU-client.

In step S520, the VTDU-client sends a preview instruction to the management server, wherein the preview instruction includes ID information of a front-end device.

In step S530, the management server that receives the preview instruction, according to the ID information, included in the preview instruction, of the front-end device, redirects to a storage device which currently stores a video stream (or a data stream) provided by the front-end device and determines ID information of the storage device.

In step S540, the management server sends redirection information to the VTDU-client, wherein the redirection information includes the ID information of the storage device.

In step S550, the VTDU-client sends a stream obtaining instruction to the redirected storage device according to the ID information of the storage device.

In step S560, the storage device that receives the stream obtaining instruction obtains the video stream from the front-end device via a build-in VTDU forwarding component.

In step S570, the storage device forwards the video stream obtained from the front-end device to the VTDU-client so as to perform video preview on the platform.

In step S580, when the storage device is abnormal such that the storage device is not able to obtain the video stream from the front-end device and thus the preview is abnormal, the VTDU-client automatically reconnects a VTDU redirection component built in the management server. The VTDU redirection component in the management server, according to the automatic reconnection, redirects the preview instruction to other storage devices which continue to store the video stream provided by the front-end device and continue to obtain the video stream from the other storage devices to preview, thereby supporting a platform preview function and guaranteeing the normal preview of the platform.

Figure 6:
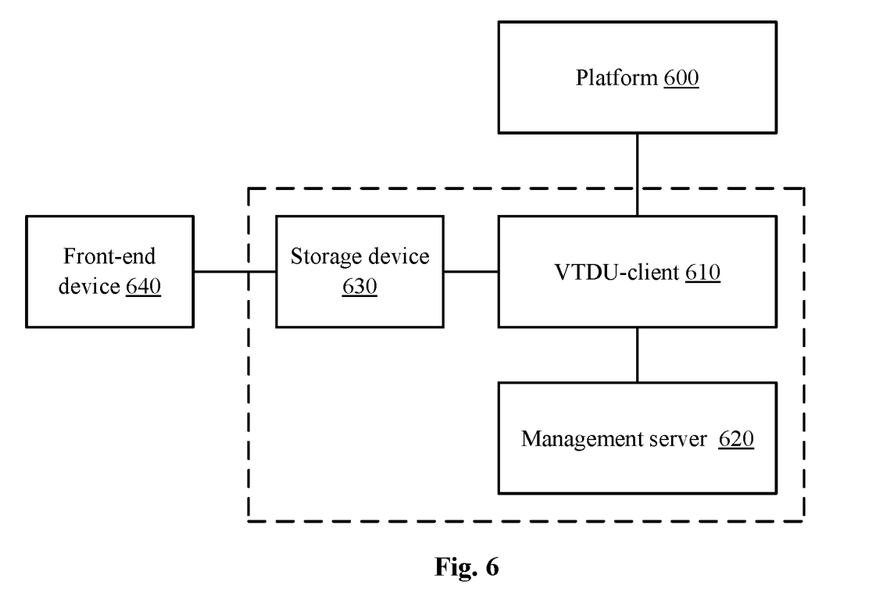
FIG. 6 is a structural diagram of a system for previewing a cloud-stored video in an embodiment of the disclosure.

A system for previewing a cloud-stored video in the embodiments of the disclosure, as shown in FIG. 6, includes a VTDU-client 610, a management server 620 and a storage device 630.

The VTDU-client 610 is connected with a platform 600, the management server 620 and the storage device 630, and is configured, after receiving a preview request sent by the platform 600, to send a preview instruction to the management server 620, wherein the preview instruction includes ID information of a front-end device 640; to send a stream obtaining instruction to the storage device 630 according to ID information of the storage device 630; and to receive and preview a video stream sent by the storage device 630.

The management server 620 is configured to receive the preview instruction and according to the ID information of the front-end device 640, redirect to the storage device 630 which currently stores the video stream provided by the front-end device 640 and determine the ID information of the storage device 630; and to send redirection information to the VTDU-client 610, wherein the redirection information includes the ID information of the storage device.

The storage device 630 is configured, according to the stream obtaining instruction, to obtain the video stream from the front-end device 640 and forward to the VTDU-client 610.

In the embodiments of the disclosure, the VTDU-client 610 is configured, when the preview is abnormal, to automatically reconnect the management server 620; the management server 620 is configured, according to the automatic reconnection, to redirect the preview instruction to other storage devices 630 which continue to store the video stream provided by the front-end device 640, and continue to obtain the video stream from the other storage devices 630.

Figure 7:
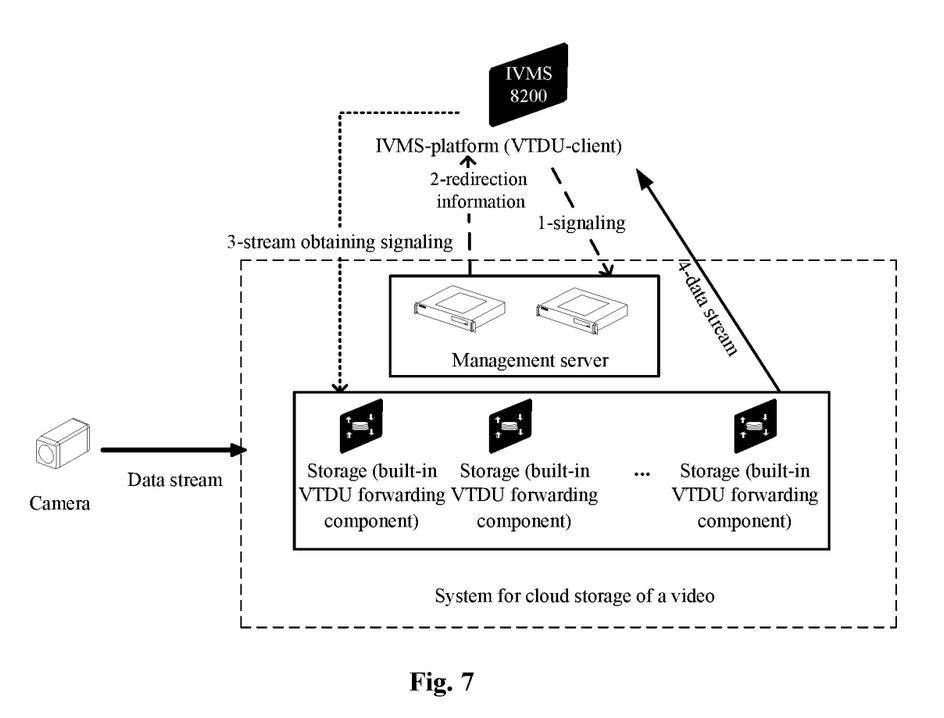
FIG. 7 is a systematic diagram of a principle framework for a system for cloud storage of a video and a system for previewing a cloud-stored video in an embodiment of the disclosure.

The system for the cloud storage of the video stream in the embodiments of the disclosure should be further referred to the above method for the cloud storage of the video stream in the embodiments of the disclosure, and a systematic diagram of a principle framework for a system for cloud storage of a video and a system for previewing a cloud-stored video in an embodiment of the disclosure shown in FIG. 7.

According to the embodiments of the disclosure, as shown in FIG. 7, a camera transmits a data stream to a system for cloud storage of a video. A VTDU forwarding component (storage (built-in VTDU forwarding component) as shown in FIG. 7) is built in a storage device, and a VTDU redirection module (1-signaling and 2-redirection information as shown in FIG. 7) is built in a management server. The built-in VTDU forwarding component in the storage device is mainly intended to obtain the data stream (3-stream obtaining signaling correspondingly shown in FIG. 7) from a front-end device accessed to the system (system for the cloud storage of the video as shown in FIG. 7), and forwards the video stream to the storage device for storage and to the platform (IVMS-platform (VTDU-client) as shown in FIG. 7, wherein the VTDU is an abbreviation of a Video Transfer & Distribute Unit) for preview (4-data stream correspondingly shown in FIG. 7).

The built-in redirection component in the management server is mainly intended to access the front-end device to the built-in VTDU forwarding components of the other storage devices according to a preset strategy when the VTDU forwarding component in the storage device obtains the stream abnormally, and record the corresponding index information, so that the stream is continuously provided for the platform to preview.

In the disclosure, by means of a mutual cooperation of the VTDU forwarding component built in the storage device and the redirection module built in the management server, it can be ensured that the storage and the preview are implemented concurrently under the condition that the front-end device merely can output one path of the stream and the correctness for the storage and preview is guaranteed. And when a VTDU in some storage device is abnormal, the disclosure may quickly take the VTDU over so that the data are guaranteed not to be lost and the user experience is improved.

According to the embodiments of the disclosure, a great number of the front-end devices can be accessed, and the efficient stream storage and preview can be implemented concurrently. When the stream is obtained and previewed at a high concurrency, as the storage and the preview of the video stream are performed independently and are not affected to each other, the system performance is effectively improved. The embodiments of the disclosure are based on the load balancing technology, so when the built-in VTDU forwarding component of the storage system is abnormal, the VTDU forwarding components in other storage devices may take the abnormal VTDU over and therefore the data stream of the front-end device is not lost.

Those skilled in the art should know that each constituent part of the device provided by the embodiments of the disclosure and each step in the method can be concentrated on a single computing device or distributed on a network formed by a plurality of computing devices, and can optionally be implemented by programmable codes executable for the computing devices, so that the modules or steps can be stored in a storage device for execution with the computing devices, or can form each integrated circuit module, or multiple modules or steps therein can form a single integrated circuit module for implementation. As a consequence, the disclosure is not limited to any specific hardware and software combination.

The implementation ways disclosed by the disclosure are as above, but the contents therein are the implementation ways adopted only for better understanding the technical solutions of the disclosure and are not intended to limit the disclosure. Any technician in the art may make modifications and variations in implementation forms and details on the premise of not departing from the spirit and the scope of the disclosure. Nevertheless, the scope of protection of the disclosure is still subjected to the scope as defined in the appended claims.

What is claimed is:

1. A method for cloud storage of a video, comprising:
    after a management server receives a video recording plan issued by a platform, determining a target storage device according to a load balancing policy, and issuing the video recording plan to the target storage device;
    obtaining and storing, by the target storage device, according to the video recording plan, a video stream from a front-end device corresponding to the video recording plan;
    when the target storage device is not able to obtain the video stream from the front-end device, sending an alarm to the management server;
    after the management server receives the alarm, issuing the video recording plan to other storage devices according to the load balancing policy; and
    after the target storage device receives the video recording plan, generating index information for the video recording plan, and sending the index information to the management server, wherein the index information at least comprises an identifier and an address of the target storage device.

2. The method as claimed in claim 1, wherein obtaining and storing, by the target storage device, according to the video recording plan, the video stream from the front-end device corresponding to the video recording plan comprises:
    generating, by the target storage device, according to the video recording plan, a video access parameter, and obtaining the video stream from the front-end device according to the video access parameter.

3. The method as claimed in claim 1, wherein the method comprises:
    after the management server receives the alarm, issuing all video recording plans being executed by the target storage device to other storage devices according to locally recorded index information and the load balancing policy.

4. A system for cloud storage of a video, comprising a management server and a target storage device, wherein:
    the management server is configured, after receiving a video recording plan issued by a platform, to determine the target storage device according to a load balancing policy and issue the video recording plan to the target storage device, and after receiving an alarm sent by the target storage device, to issue the video recording plan to other storage devices according to the load balancing policy;
    the target storage device is configured, according to the video recording plan, to obtain and store a video stream from a front-end device corresponding to the video recording plan; and
    when the target storage device is not able to obtain the video stream from the front-end device, to send the alarm to the management server;
    the target storage device is configured to generate index information for the video recording plan, and send the index information to the management server, wherein the index information at least comprises an identifier and an address of the target storage device.

5. The system as claimed in claim 4, wherein the target storage device is configured to:
    generate a video access parameter according to the video recording plan; and
    obtain the video stream from the front-end device according to the video access parameter.

6. The system as claimed in claim 4, wherein
    the management server is configured, after receiving the alarm, to issue all video recording plans being executed by the target storage device to other storage devices according to locally recorded index information and the load balancing policy.

7. A method for previewing a cloud-stored video, the method comprising:
    storing the cloud-stored video according to the method recited in claim 1;
    after the target storage device receives a preview request sent by the platform, sending a preview instruction to the management server, wherein the preview instruction comprises Identifier (ID) information of a front-end device;
    receiving, by the management server, the preview instruction and according to the ID information of the front-end device, redirecting to a storage device which currently stores a video stream provided by the front-end device and determining ID information of the storage device;

sending, by the management server, redirection information to the target storage device, wherein the redirection information comprises the ID information of the storage device;

sending, by the target storage device, a stream obtaining instruction to the storage device according to the ID information of the storage device; and obtaining, by the storage device, the video stream from the front-end device and forwarding to the target storage device to preview.

8. The method as claimed in claim 7, further comprising:

when the storage device is abnormal such that the storage device is not able to obtain the video stream from the front-end device, automatically reconnecting, by the target storage device, to the management server; and redirecting, by the management server, according to an automatic reconnection, the preview instruction to other storage devices which continue to store the video stream provided by the front-end device, and continuing to obtain the video stream from said other storage devices.

9. A system for previewing a cloud-stored video, comprising:

providing a system for cloud storage of a video, the system for cloud storage of a video comprising a management server and a target storage device, wherein:

the management server is configured, after receiving a video recording plan issued by a platform, to determine the target storage device according to a load balancing policy and issue the video recording plan to the target storage device, and after receiving an alarm sent by the target storage device, to issue the video recording plan to other storage devices according to the load balancing policy;

the target storage device is configured, according to the video recording plan, to obtain and store a video stream from a front-end device corresponding to the video recording plan; and when the target storage device is not able to obtain the video stream from the front-end device, to send the alarm to the management server;

the target storage device is also configured, generating index information for the video recording plan, and send the index information to the management server, wherein the index information at least comprises an identifier and an address of the target storage device;

after the target storage device receives a preview request sent by the platform, sending a preview instruction to the management server, wherein the preview instruction comprises Identifier (ID) information of the front-end device to send a stream obtaining instruction to the storage device according to ID information of the storage device and to receive a video stream sent by the storage device and to preview;

the management server is configured to receive the preview instruction and according to the ID information of the front-end device, redirect to the storage device which currently stores the video stream provided by the front-end device and determine the ID information of the storage device and to send redirection information to the VTDU-client, wherein the redirection information comprises the ID information of the storage device; and the storage device is configured to obtain the video stream from the front-end device and forward the obtained video stream to the target storage device according to the stream obtaining instruction.

10. The system as claimed in claim 9, wherein:

the target storage device is configured, when a preview is abnormal, to automatically reconnect the management server; and the management server is configured, according to an automatic reconnection, to redirect the preview instruction to other storage devices which continue to store the video stream provided by the front-end device and continue to obtain the video stream from said other storage devices.

* * * * *